United States Patent
Jorna et al.

[11] 3,990,786
[45] Nov. 9, 1976

[54] APODIZER APERTURE FOR LASERS

[75] Inventors: Siebe Jorna; Larry D. Siebert, both of Ann Arbor, Mich.; Keith A. Brueckner, La Jolla, Calif.

[73] Assignee: KMS Fusion, Inc., Ann Arbor, Mich.

[22] Filed: Oct. 9, 1974

[21] Appl. No.: 513,341

[52] U.S. Cl. .......................... 350/205; 350/162 SF; 350/312
[51] Int. Cl.² ........................ G02B 5/24; G02B 5/20
[58] Field of Search ............... 350/3, 205, 179, 267, 350/162 R, 162 SF, 312, 206

[56] References Cited
UNITED STATES PATENTS
3,867,017  2/1975  Bliss et al. ........................... 350/205

OTHER PUBLICATIONS

Jacquinot et al., "Apodisation," in Progress In Optics III, ed. by E. Wolf, North–Holland Publishing Co., 1964, p. 55.

*Primary Examiner*—Ronald J. Stern
*Attorney, Agent, or Firm*—Barnes, Kisselle, Raisch & Choate

[57] ABSTRACT

An aperture attenuator for use with high power lasers which includes glass windows shaped and assembled to form an annulus chamber which is filled with a dye solution. The annulus chamber is shaped such that the section in alignment with the axis of the incident beam follows a curve which is represented by the equation $y = (r - r_o)^n$.

1 Claim, 4 Drawing Figures

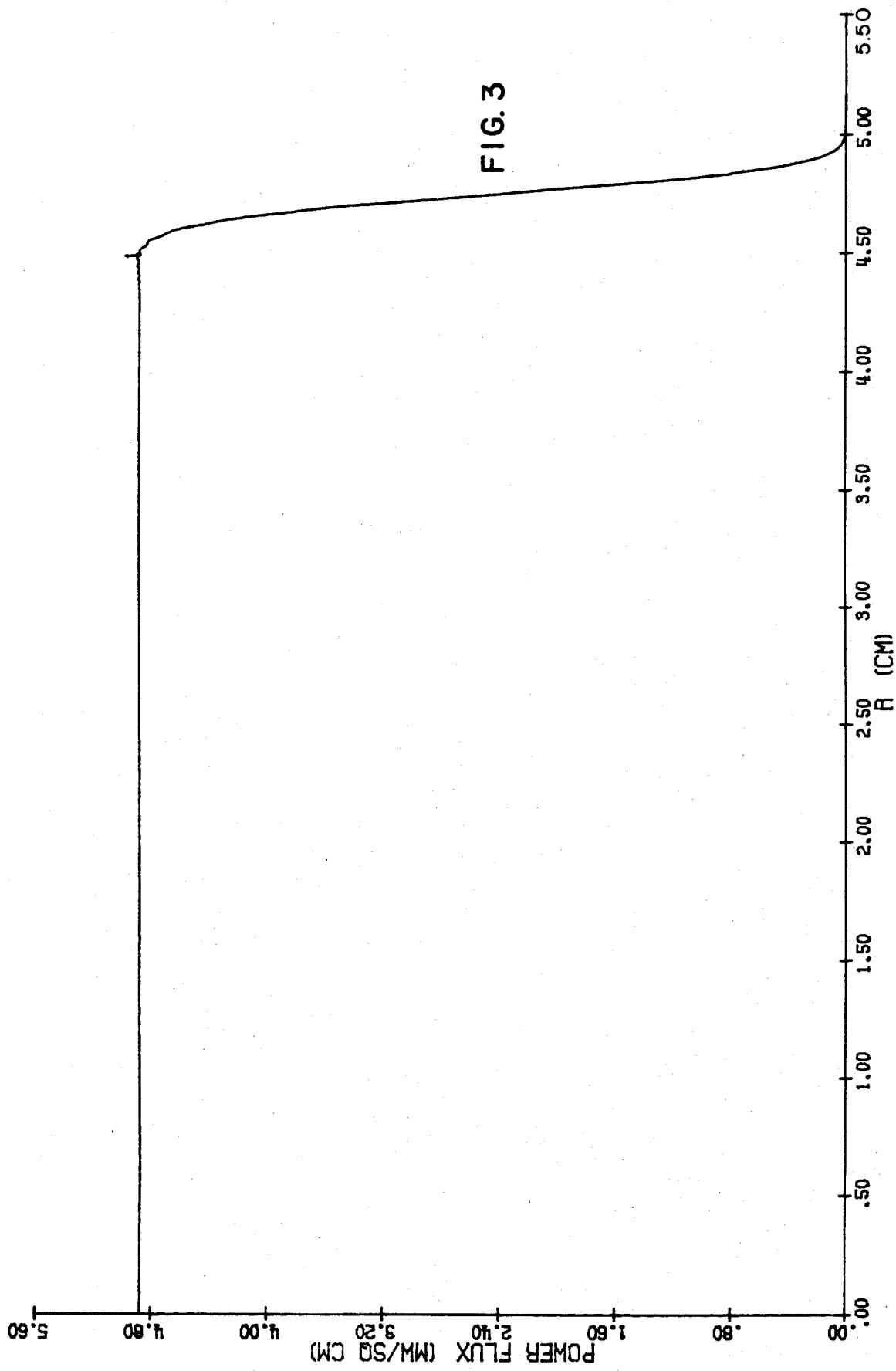

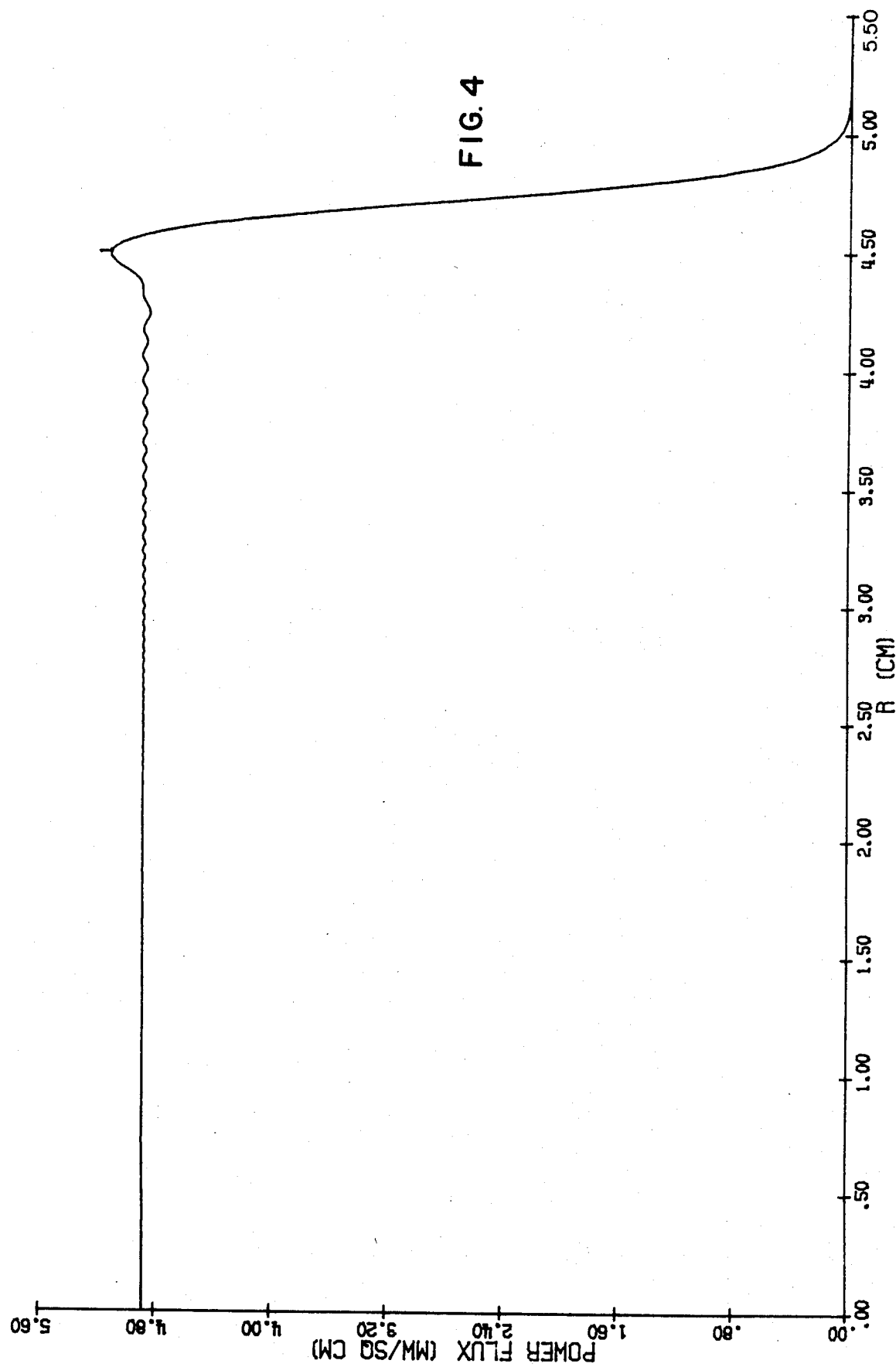

APODIZER APERTURE FOR LASERS

This invention relates to an Aperture Attenuator and more particularly to an attenuator for shaping intensity profiles of light beams.

It is an object of the invention to shape the intensity profile of a collimated laser beam in order to minimize diffraction-induced self-focusing in glass laser amplifiers.

It is a further object of the invention to provide a simple and reliable device for controlling intensity profiles and to provide an aperture structure which can be designed to allow optimum compromise between the amount of energy transmitted and the minimization of diffraction effects.

The design of aperture attenuators, sometimes referred to as apodizers, has been under study for some time; the problem, as above indicated, involves minimizing diffraction of the laser beam as it passes through various stages of an optical system. It is, of course, important that a maximum amount of energy be transmitted so that there are no appreciable losses.

A co-pending application, filed in the name of Robert L. Nolen, Jr. and Larry D. Siebert, entitled "High Power Laser Apodizer," Ser. No. 513,340, filed Oct. 9, 1974, describes in general the problem of aperture attenuators and discloses the use of a dye for these structures. The present application relates to the configuration of the dye chamber to obtain optimum conditions.

Other objects and features of the invention relating to details of construction will be apparent in the following description and claims in which the principle of the invention is disclosed, together with the best mode presently contemplated.

Figure 1:
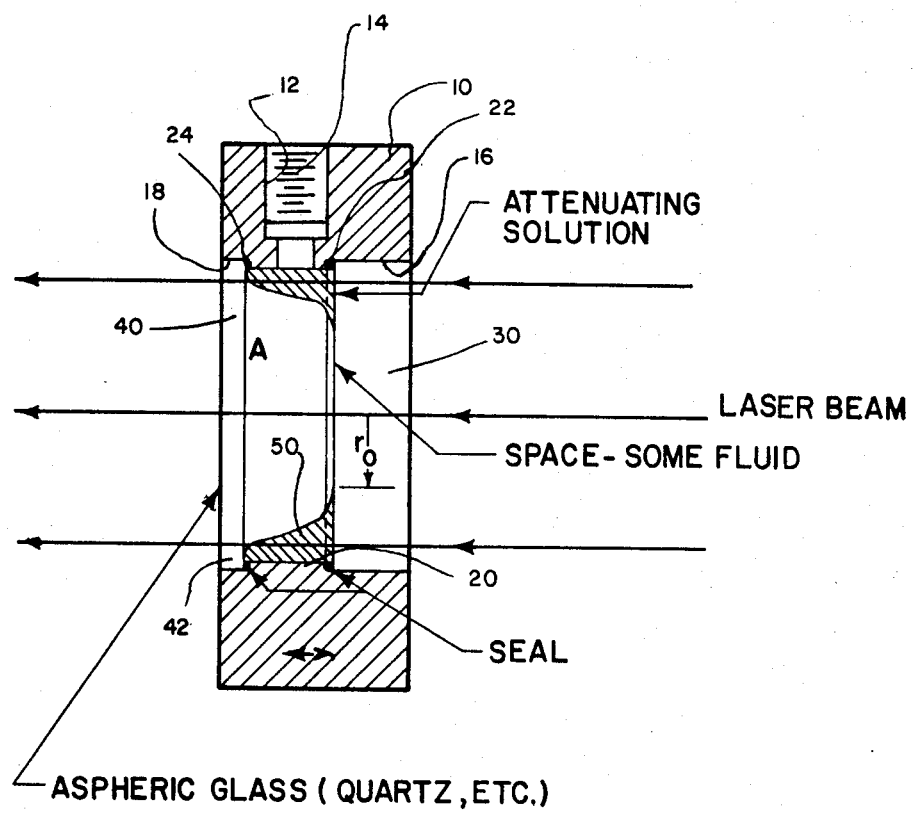

Drawings accompany the disclosure and the various views thereof may be briefly described as:

FIG. 1, a cross-sectional view of an attenuator window.

Figure 2:
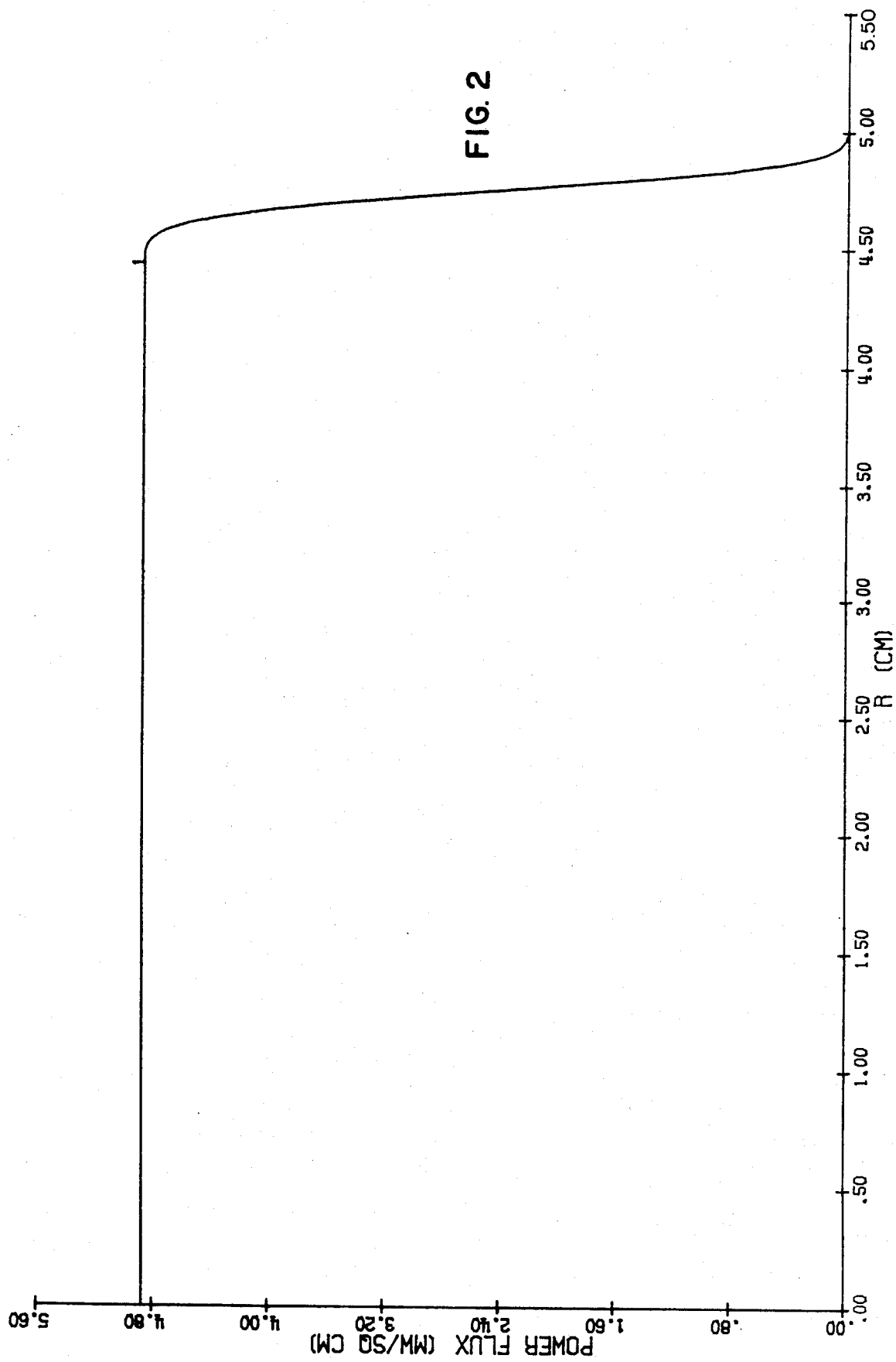

FIGS. 2, 3 and 4, power flux diagrams showing, respectively, transmitted intensity profiles for 0, 2 and 8 meters.

REFERRING TO THE DRAWINGS

In FIG. 1, there is illustrated an attenuator window having an outer support ring 10 provided with an opening 12 closed by a plug 14. The attenuator ring has an aperture opening 16 on the side incident to the laser beam which terminates in an opening 18 at the other side of the ring. Between these openings is a portion 20 having a smaller diameter than the other openings to provide two shoulders at which there are located O-rings 22 and 24. In the opening 16 is a plain glass or quartz cylinder 30 having a planar inner surface and which seats on its inner side against the O-ring 22. On the other side in the aperture 18 is a glass stopper element A, indicated at 40, which has an annular cylindrical portion 42, the inner edge of which seats against the O-ring 24.

A liquid is intended to be contained in the annulus volume formed between the elements 30 and 40. This annulus chamber is shaped to provide a space for the desired amount of attenuating dye solution in the desired portions of the beam. This is for the purpose of eliminating diffraction rings from an aperture in a laser beam by providing a gradually increasing attenuation near the edge of the beam.

It will be appreciated that if the laser beam is not to be optically distorted, the dye solution retained in the annular chamber must have the same index of refraction as the windows. For example, copper sulfate in water has been used in dye cells to attenuate laser beams, but there is no suitable window material which will index-match the water solution. Similarly, attempts to match quartz windows with a mixture of DmSO:H$_2$O and benzyl alcohol in water resulted in unstable solutions that precipitated a copper salt.

Neodymium glass is quite frequently used with high power laser systems. This emits radiation at 1.06 microns in the infrared portion of the spectrum not visible to the human eye. Thus, it is desirable to obtain a liquid for use in an apodizer which will be compatible with the glass used and which will assist in shaping of the laser beam to minimize the diffraction-induced self-focusing effect. The liquid must be stable in the presence of the laser beam so that it is not affected by the electronic transitions that occur during absorption of photons. The transmission must not increase as the power goes up.

It has been discovered that a satisfactory dye solution can be formed from copper nitrate, $Cu(NO_3)_2$, in dimethyl sulfoxide and water, $(CH_3)_2SO:H_2$). The relative quantities of the dimethyl sulfoxide in water can be readily adjusted to index-match fused quartz apodizer windows at 1.06 micrometer wave lengths for nearly any operating temperature.

Thus, a quantity of liquid 50 of suitable non-bleachable characteristics as above described is contained in the annulus between the elements 30 and 40 shown by the finely cross-hatched area. A laser beam incident from the right through the opening 16 has its intensity gradually reduced from a maximum in the center of the apodizer to some predetermined value at its edge.

The detailed shape of the transmitted intensity profile is governed by the dimension of the central aspheric glass stopper A and the absorptance K of the liquid. For instance, the glass surface of the stopper A in contact with the absorbing liquid is readily ground to a particular shape which can be represented by $y = (r - r_o)^n$, where $r$ is the outer aperture dimension and $r_o$ is the small radius of the dye chamber. This yields the transmission profile $e^{-K(r-r_o)^n}$ for $r > r_o$ and 1 for $0 < r < r_o$, where $r_o$, the small radius dimension, is determined by the aperture dimensions.

In order to determine the optimum profile desirable for laser transmission, extensive calculations for a number of values of n have been carried out. These indicate that $n = 4$ is a satisfactory compromise which reduces energy losses to a minimum compatible with suppression of diffraction rings which would lead to an enhanced self-focusing on subsequent amplification in glass laser amplifier rods.

The results of the above-mentioned calculations with $n = 4$ provide that $K = 53.35$ and $r_o = 4.4$ cm. These numbers have been selected so that at the edge of an effective aperture of radius 5.0 centimeters, the intensity has dropped to 0.1 percent of its central value. Proceeding on the assumption that there is uniform illumination of the apodizer, the curves shown in FIGS. 2, 3 and 4 illustrate the transmitted intensity. The curve in FIG. 2, at 0 meters, has very little variation. The curve in FIG. 3 shows a slight disturbance between the radius 4.5 and 5.0 cm. at 2 meters. The curve in FIG. 4 shows some disturbance between the radius 2.5 and 5.0 cm. at 8 meters. The intensity fluctuation due to refraction at 8 meters is about 5 percent and the calculations have shown that this leads to minimal self-focusing enhancement in subsequent amplifier rods at the indicated levels of power flux input. An apodizer characterized by the above parameters has been manufactured and tested with results that show excellent conformance with the calculations.

We claim:

1. An apodizer aperture for use with lasers and formed by an optical element on the optical axis of the laser beam having an annular chamber composed of optical windows for the reception of an attenuating dye solution having the same index of refraction as the optical windows, that improvement which comprises:

one optical window having a planar surface forming one boundary wall of said chamber, said planar surface being perpendicular to and centered on the optical axis, and a second optical window forming a second boundary wall of said chamber, said second wall having a flat central portion perpendicular to and centered on the optical axis, said central portion having an outer radius $r_o$, and a peripheral annular portion having an inner radius $r_o$ and an outer radius $r$ on a curve represented by the equation $y = (r - r_o)^n$ where $n$ has at least a value of 4 and where $y$ is a distance along the optical axis.

* * * * *